Figure 1:
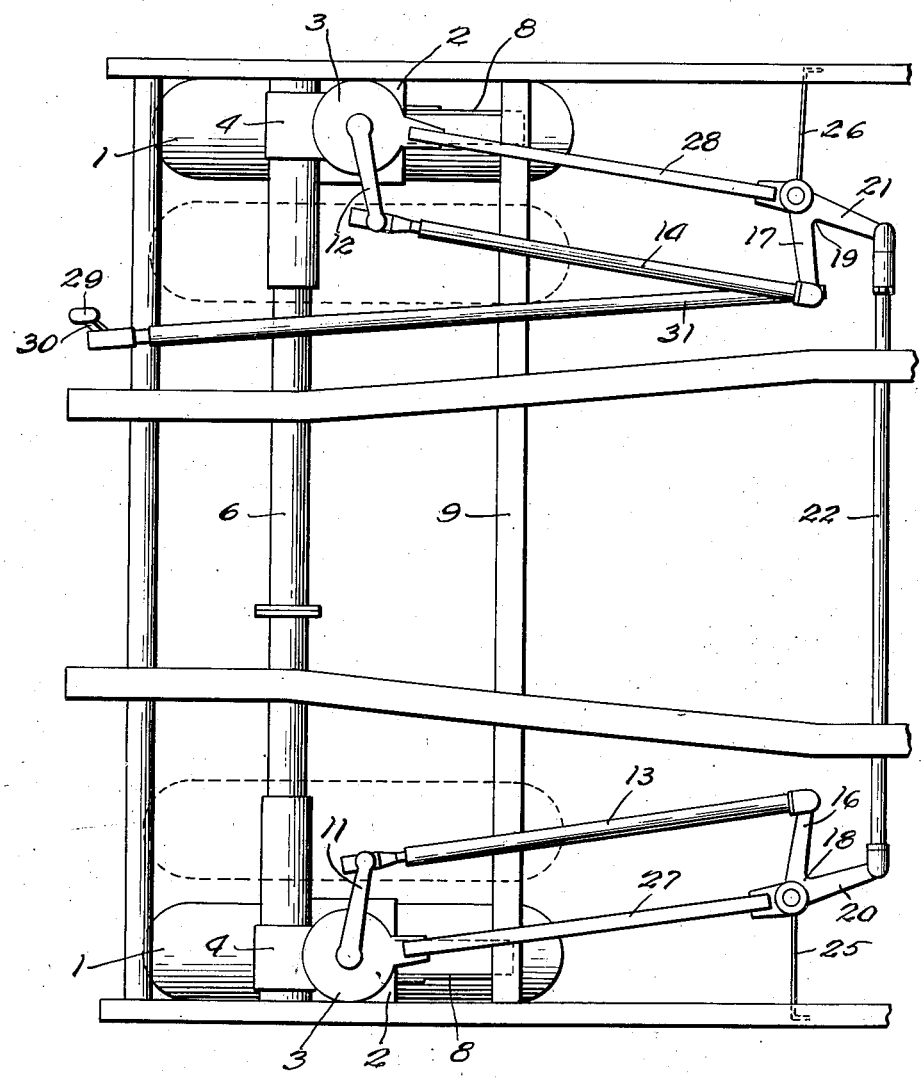

Aug. 30, 1949.　　　　E. T. J. TAPP ET AL　　　　2,480,309
STEERING GEAR FOR VARIABLE TRACK VEHICLES
Filed July 31, 1947　　　　　　　　　　　　　　2 Sheets-Sheet 2
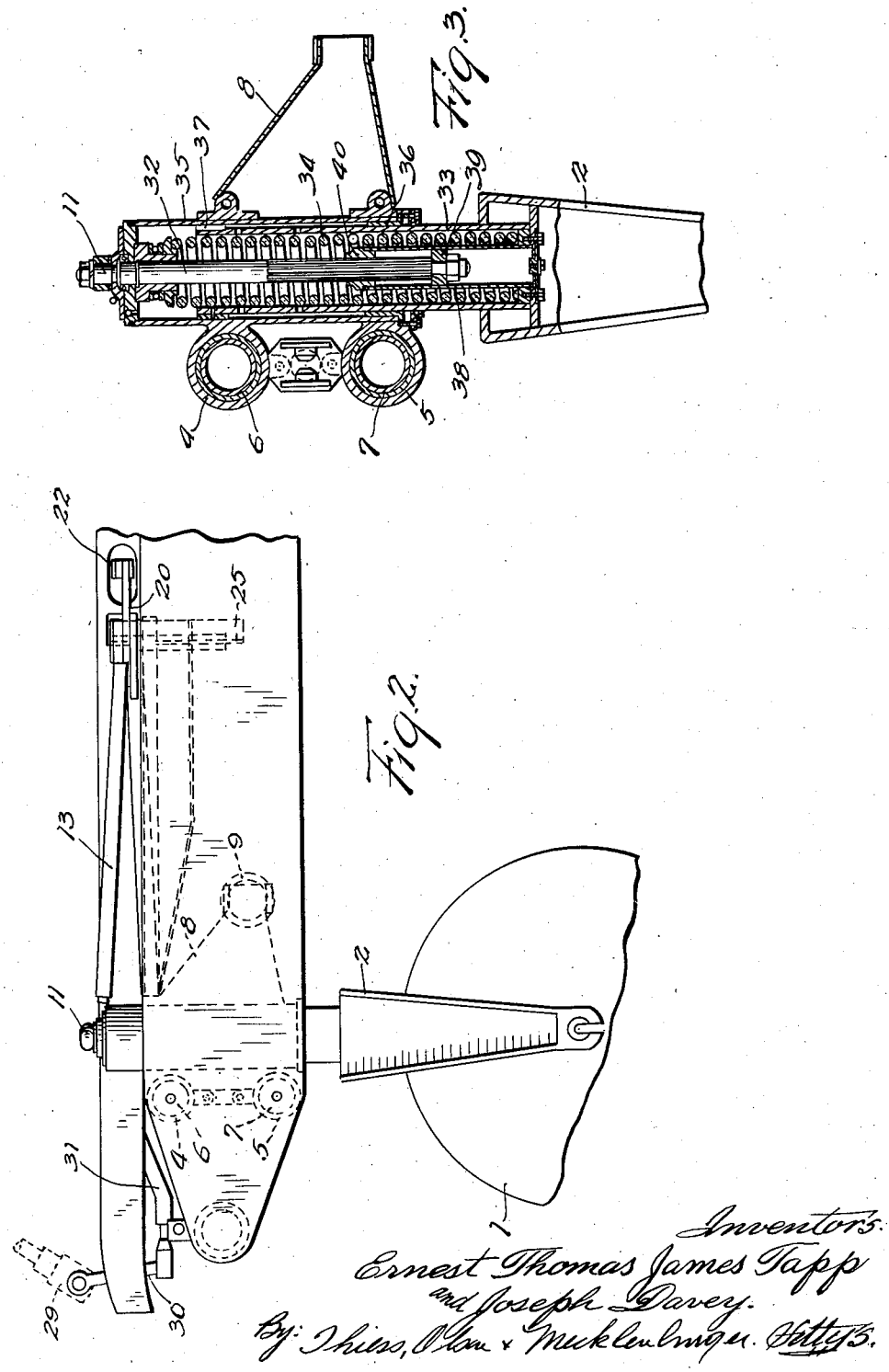

Patented Aug. 30, 1949

2,480,309

UNITED STATES PATENT OFFICE 2,480,309

STEERING GEAR FOR VARIABLE TRACK VEHICLES

Ernest T. J. Tapp and Joseph Davey, Fleet, England, assignors to Pest Control Limited, Harston, Cambridgeshire, England, a British company Application July 31, 1947, Serial No. 765,094
In Great Britain May 23, 1946

Section 1, Public Law 690, August 8, 1946
Patent expires May 23, 1966

5 Claims. (Cl. 280—87)

This invention relates to an improved steering gear for variable track vehicles.

It may often be desirable for special purposes to vary the track of a vehicle. For example with agricultural vehicles employed for spraying or cultivating rows of crops it is desirable to be able to widen or narrow the track at will to suit the width of crop rows, so that the wheels of the vehicle always run along the space between adjacent rows. In vehicles of this type which are provided with the conventional Ackermann steering, it is necessary to adjust the length of the track rod each time the track of the steered wheels is varied.

According to this invention there is provided an improved steering gear for variable track vehicles comprising a pivotal mounting for each steered wheel and its associated steering arm, said mounting being displaceable transversely of the vehicle, a radius rod connected to said pivotal mounting and extending longitudinally of the vehicle, and a connecting rod operatively connected at one end to said steering arm and at the other end to steering control means in such a way as to remain parallel in plan to said radius rod on transverse displacement of said pivotal mounting.

The improved steering gear makes it possible to displace the steered wheels transversely of the vehicle to widen or narrow the track, without any consequential adjustment of the steering mechanism being necessary, and without substantial alteration in the direction in which the wheels lie.

Steering motion may be transmitted from a control lever linked by the connecting rod to the steering arm, the control lever being pivoted in a bearing to which the end of the radius rod is connected, so that the steering arm and control lever, and the radius rod and connecting rod, respectively form opposite pairs of sides of a parallelogram as seen in plan. The control lever for one wheel is linked to the control lever for the other wheel and to a steering box in known manner.

Preferably the pivotal wheel mounting is arranged for rectilinear transverse displacement, and the control lever bearing is permitted a limited longitudinal movement but is restrained from transverse movement, but it is also possible to employ a fixed control lever bearing and to arrange the pivotal wheel mounting for transverse displacement along an arc centered on the bearing.

It is preferable, particularly when the vehicle is to have the high clearance desirable in an agricultural machine, to mount the front wheels in forks. The front wheels may however be carried on stub axles and king pins, particularly when a high clearance is not desired.

A preferred embodiment of the invention will now be described by way of example with reference to the accompanying drawings, Figs. 1 and 2 of which show respectively a plan and a side elevation of the fore part of a vehicle chassis. Fig. 3 is a vertical sectional view, on a somewhat enlarged scale, of the pivotal mounting for the steerable wheel.

Referring now to the drawings, the front wheels 1 of the vehicle are mounted on hydraulically damped spring forks 2. The head bearings 3 of the forks are supported by upper and lower bearings 4 and 5, slidably carried on transverse horizontal tubular members 6 and 7. Tail pieces 8 engage in guideways formed in a third transverse horizontal tubular member 9. Location bolts, not shown, are provided for locking the slidable bearings at various positions on the transverse members. Steering arms 11 and 12 are fixed to the heads of the wheel forks so as to rotate therewith. The steering arms 11, 12 are linked through separate connecting rods 13, 14 to the arms 16, 17 of separate bell cranks 18, 19, the other arms 20, 21 of the bell cranks 18, 19 being connected to each other by a normal track rod 22.

The two bell cranks 18, 19 are pivotally mounted in bearings carried on spring blades 25, 26 secured to the side members of the chassis so as to permit an arcuate movement of the bearings tangential to the longitudinal direction of the frame. Each bell crank bearing is attached to one end of a radius rod 27, 28, the other end of which is rotatably secured around the head bearing of the respective steering fork. Each connecting rod 13, 14 and radius rod 27, 28 forms a parallelogram as seen in plan with its respective steering arm 11, 12 and bell crank arm 16, 17.

The bell crank bearings are preferably so spaced from each other and from either side of the chassis that the radius rods 27, 28 are parallel with each other and with the centre line of the chassis when the steerable wheels are locked at a mean track width, i. e. half-way between their greatest width as shown in full lines in Fig. 1, and their least width as shown in dotted lines.

A normal steering box 29 and drop arm 30 may be employed to actuate the steering by means of a link 31 extending from the drop arm 30 to the arm 17 of the bell crank 19.

The pivotal mountings for the steerable wheels are illustrated in Fig. 3 which shows a section through the fork, stem and mountings for one of the front wheels. Thus one of the steering arms 11 is secured to a vertical rod 32. This cooperates with a tube 33 containing a coil spring 34 which is guided in an upper tube 35 by the lower fixed bushing 36, there also being an upper sliding bushing 37 attached to the lower tube. A smaller tube 38 is also fixed to the fork and forms a guide for the plunger 39 attached to the splined steering shaft 32 from which it receives its steering movement through the splined collar 40 which caps the tube 38. The latter also forms a cavity for oil which in conjunction with the action of the piston and holes in the tube wall serves hydraulically to damp the movement of the spring 34. The shaft 32 is not permitted vertical movement relative to the vehicle frame and carries the steering arm 11 at its upper end. The outer tube 35 is fixed to the vehicle frame by cylindrically bored brackets 4 and 5 through the medium of the tubular cross members 6 and 7, as already explained.

This particular method of mounting is subject to considerable variation, and the detailed description is given merely for greater clarity in the understanding of the general principles of the invention, as already described hereinabove.

An alternative means for transmitting steering motion to the steered wheels may comprise a transverse shaft rotatably mounted in a bearing at each side of the vehicle, each bearing being slideable fore and aft and being connected by a radius rod to the head bearing of the wheel on its respective side. Two control levers are carried on the shaft, each lever being linked by a connecting rod to its respective steering arm and each being so disposed on the shaft that its associated connecting rod is parallel in plan to its respective radius rod.

We claim:

1. An improved steering gear for the steered wheels of a variable track vehicle, comprising a pivotal mounting for each steered wheel, said mounting being displaceable transversely of said vehicle, a steering arm associated with each said steered wheel, a radius rod connected to each said pivotal mounting and extending longitudinally of said vehicle, and a connecting rod operatively connected at one end to said steering arm and at the other end to steering control means in such a way as to remain parallel in plan to said radius rod on transverse displacement of said pivotal mounting.

2. An improved steering gear for the steered wheels of a variable track vehicle, comprising a pivotal mounting for each steered wheel, said mounting being displaceable transversely of said vehicle, a steering arm associated with each said steered wheel, a steering control lever pivoted about an axis, a radius rod pivoted at one end about the axis of said pivotal mounting and pivoted at the other end about the axis of said steering control lever, and a connecting rod linking said steering arm to said steering control lever, said steering arm and said steering control lever, and said radius rod and said connecting rod, respectively forming opposite pairs of sides of a parallelogram when viewed in plan.

3. An improved steering gear for the steered wheels of a variable track vehicle, comprising a head bearing for each steered wheel, said head bearing being slidably mounted on a cross-member of said vehicle, a steering arm associated with each said steered wheel, a steering control lever pivoted about an axis displaceable fore-and-aft with respect to said vehicle, a radius rod pivoted at one end about the axis of said head bearing and pivoted at the other end about the axis of said steering control lever, and a connecting rod linking said steering arm to said steering control lever, said steering arm and said steering control lever, and said radius rod and said connecting rod, respectively forming opposite pairs of sides of a parallelogram when viewed in plan.

4. An improved steering gear for the two steered wheels of a variable track vehicle, comprising a head bearing at each side of said vehicle for each steered wheel, said head bearings being slideably mounted on a cross-member of said vehicle, a steering arm associated with each said steered wheel, a bell crank lever operatively connected to each steered wheel, each bell crank lever being pivoted about an axis displaceable fore-and-aft with respect to said vehicle, a rod linking together one arm of each said bell crank lever, the second arm of each lever forming the steering control arm of its respective steered wheel, a radius rod at each side of said vehicle pivoted at one end about the axis of said head bearing and pivoted at the other end about the axis of said bell crank lever, and a connecting rod at each side of said vehicle linking said steering control arm to its respective steering arm, said steering arm and said steering control arm, and said radius rod and said connecting rod, respectively forming opposite pairs of sides of a parallelogram.

5. An improved steering gear for the two steered wheels of a variable track vehicle, comprising a head bearing at each side of said vehicle for each steered wheel, said head bearings being slideably mounted on a cross member of said vehicle, a steering arm associated with each said steered wheel, a transverse steering control shaft rotatably mounted in a bearing at each side of said vehicle, each said control shaft bearing being slideable fore-and-aft and being connected by a radius rod to the head bearing of the wheel on its respective side, two control levers carried on said shaft, each lever being linked by a connecting rod to its respective steering arm and being so disposed on said shaft that its said associated connecting rod is parallel in plan to its said respective radius rod.

ERNEST T. J. TAPP.
J. DAVEY.

No references cited.